United States Patent [19]

Yoshimura et al.

[11] Patent Number: 5,265,715
[45] Date of Patent: Nov. 30, 1993

[54] CONVEYOR BELT FOR CONVEYING CAN BODIES IN CAN BODY WASHING AND SURFACE TREATMENT EQUIPMENT

[75] Inventors: Takayuki Yoshimura, Omiya; Yoshiteru Kondo, Tokyo; Kiyoaki Inoue, Hachioji; Yoshimasa Matsumura, Sagamihara, all of Japan

[73] Assignee: Daiwa Can Company, Tokyo, Japan

[21] Appl. No.: 963,709

[22] Filed: Oct. 20, 1992

[30] Foreign Application Priority Data

Oct. 22, 1991 [JP] Japan .................. 3-094160

[51] Int. Cl.⁵ .......................................... B65G 15/54
[52] U.S. Cl. .................................. 198/848; 198/853; 198/779
[58] Field of Search ............... 198/779, 848, 850, 851, 198/852, 853

[56] References Cited

U.S. PATENT DOCUMENTS

| | | | |
|---|---|---|---|
| 3,348,680 | 10/1967 | Mathews et al. | 198/851 X |
| 4,078,655 | 3/1978 | Roinestad | 198/848 |
| 4,262,794 | 4/1981 | Bourgeois | 198/779 X |

FOREIGN PATENT DOCUMENTS

| | | | |
|---|---|---|---|
| 1034069 | 7/1978 | Canada | 198/848 |
| 0377775 | 7/1990 | European Pat. Off. | 198/848 |
| 54-49086 | 4/1979 | Japan . | |
| 0783056 | 9/1957 | United Kingdom | 198/848 |

Primary Examiner—Robert P. Olszewski
Assistant Examiner—James R. Bidwell
Attorney, Agent, or Firm—Wenderoth, Lind & Ponack

[57] ABSTRACT

A belt includes a plurality of rows of endless chains and can body conveying sections each defined between adjacent ones of the chains. Each of the endless chains are formed includes a plurality of U-shaped unit members each having a bottom fitted in an open end portion of a preceding one in the row, the engaged portions of the preceding and succeeding unit members being connected together by a plurality of rotatable connecting rods common to the chains. Intermediate rods having a length a little greater than the can body diameter are each provided between adjacent ones of the rods of the chains and also being opposed unit members of adjacent chains. The intermediate rods are disposed at a common elevation as the connecting rods beneath the top of the chains. Thus, the conveyer belt can convey can bodies in a plurality of rows in which the can bodies will not touch each other at the open ends of these can bodies.

16 Claims, 2 Drawing Sheets

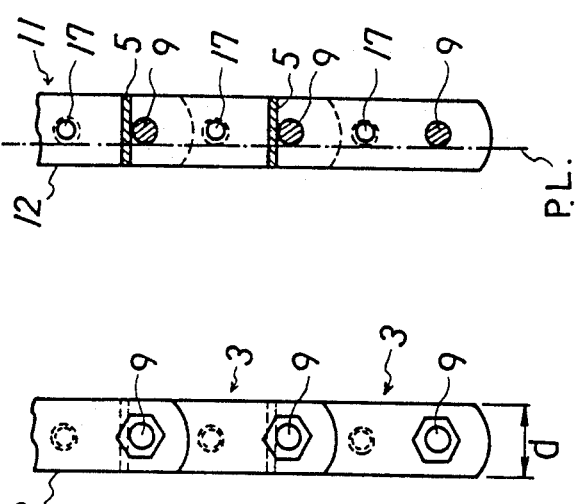
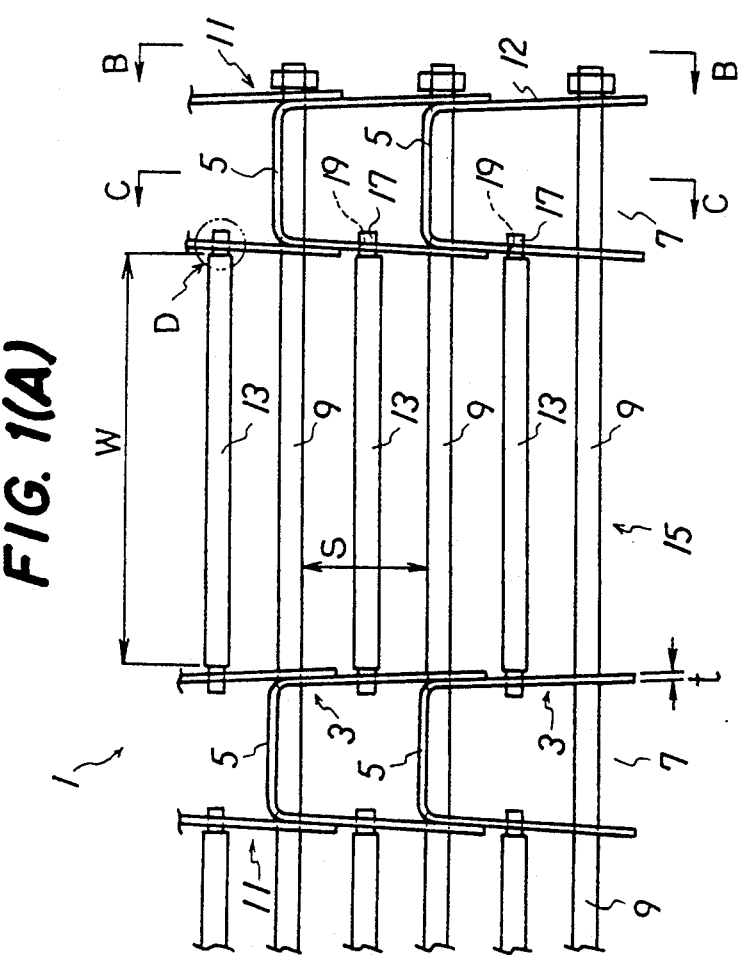
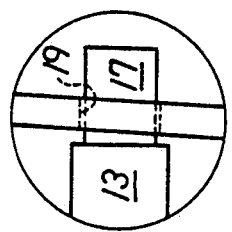

CONVEYOR BELT FOR CONVEYING CAN BODIES IN CAN BODY WASHING AND SURFACE TREATMENT EQUIPMENT

FIELD OF THE INVENTION

This invention relates to an improved conveyor belt for conveying can bodies in can body washing and surface treatment equipment.

PRIOR ART

Can bodies, such as drawned and ironed can bodies, are formed by drawing and ironing processes and the formed can bodies are trimmed and then subjected to a series of washing and surface treatment processes, prior to receiving decoration, including removal of lubricant by a detergent, removal of the detergent, surface treatment by chemicals, removal of the chemicals and rinsing. The formed can bodies are essentially subjected to such surface treatment as otherwise they can not be provided with satisfactory decoration in a subsequent printing process.

In the washing and surface treatment processes, the can bodies are placed in an inverted state, i.e., with their open ends down and their bottoms up, on a horizontally extending portion of an endless conveyor belt and conveyed through washing and surface treatment equipment. As the can bodies move through the equipment, they receive sprays of washing and surface treatment fluids (including industrial water, a detergent solution, chemical treatment solutions and deionized water for final rinsing) one after another from series of upper and lower spray nozzles-respectively located above and below the path of the conveyor belt in the equipment.

The endless conveyor belt is of a net-like construction so as to permit sprays of the fluids directed toward the can bodies from the upper spray nozzles to flow down through it and permit sprays of the fluids directed from tile lower spray nozzles to reach inner surfaces of the can bodies.

Beneath the endless conveyor belt, a plurality of fluid tanks are disposed for receiving used fluids and the fluids in the fluid tanks are pumped up and returned to the respective spray nozzles.

A typical arrangement of the endless conveyor belts conventionally used for the aforementioned application will now be described with reference to FIG. 2.

FIG. 2, (A') is a fragmentary plan view of a belt 21, and (B') is a side sectional view of the belt 21 taken along line B'—B' in FIG. 2 (A'). The belt 21 has a large number of elongated sinuous plate members 23 each formed by bending a narrow and elongated metal strip to a configulation having alternate U-shaped projections. These members are assembled into a net-like belt by engaging the bottom portion 25 of each U-shaped projection with the open end portions of a U-shaped projection of another sinuous plate member 23 and inserting a connecting rod 29, having a length corresponding to the full width of the belt, through the individual engaged portions to link both plate members with each-other such that the assembled belt can be flexed about the respective connecting rods 29, as disclosed in Japanese Utility Model Laid-open Publication No. 49086/1979.

The aforementioned net-like conveyor belt has disadvantages in that it may readily cause a significant number of defective can bodies for the following reasons.

When can bodies such as drawn and ironed can bodies are conveyed through the washing and surface treatment equipment by means of the aforementioned net like conveyor belt, the can bodies are placed in an inverted position and in masses on the belt with the open end portions of the can bodies being in contact with the top horizontal portions of the sinuous plate members (which top horizontal portions create a can body path line) of the belt.

Therefore, the can bodies are highly liable to be moved by rattling of the belt and imbalanced spraying of the fluids, so that the can bodies inevitably come into contact with one another and such contact areas can not receive adequate surface treatment in the equipment. In addition, flaws and nicks may readily develop in the open end portions of the can bodies which are in contact with thin edge portions of the sinuous plate members of the belt due to unavoidable movement of the can bodies thereon.

SUMMARY OF THE INVENTION

An object of the present invention is to provide an improved conveyor belt for conveying can bodies, which can successfully eliminate the aforesaid disadvantages.

According to the present invention there is provided a conveyor belt for conveying can bodies in can body washing and surface treatment equipment, which comprises a plurality of rows of endless chains and a plurality of endless can body conveying sections each defined between two adjacent rows of the endless chains. The endless chains are each formed by a plurality of U-shaped unit members, each engaged at the bottom with the open end of another unit member and both linked together at the engaged portions by a connecting rod having a circular cross section. Each connecting rod is common to the rows of endless chains and is rotatable in the engaged portions of the unit members. The can body conveying sections each defined between the endless chains are formed by a plurality of the connecting rods and a plurality of intermediate rods and each has a width a little greater than the diameter of can bodies to be conveyed. The intermediate rods have a circular cross section and are provided between the connecting rods to extend between adjacent rows of the endless chains over a length a little greater than the diameter of the can bodies to be conveyed. The connecting rods and the intermediate rods are disposed at a common elevation to support the open ends of the can bodies at an elevation lower than the top horizontal portion of the endless chains.

The respective connecting rods and intermediate rods may be arranged parallel to one another.

The respective connecting and in rods may be equally spaced apart from one another and all have the same common diameter.

Also each intermediate rod may have a reduced diameter at both end portions which rotatably supported in holes formed in opposed arms of each U-shaped unit member.

With a conveyor belt according to the invention, inverted can bodies are received in rows on the endless can body conveying sections of the belt. Each such section has a width a little greater than the diameter of the can bodies and is separated from one another by the endless chains serving as partitioning members, such that the can bodies in a row may not come in contact with those in adjacent rows. Further, the endless can body conveying sections are formed by rods 9 and 13, both traveling at a common elevation to form a can body pass line, such that, even if a can body is moved over the belt, its open end will generally be in contact with small areas of slightly curved surfaces of the rods and in rolling contact at least with the connecting rods 9.

BRIEF DESCRIPTION OF THE DRAWINGS

FIG. 1(A) is a plan view of an embodiment of a conveyor belt according to the invention, FIG. 1(B) is a sectional view taken along line B—B in FIG. 1(A), FIG. 1(C) is a sectional view taken along line C—C in FIG. 1(A), and FIG. 1(D) is a view on an enlarged scale of portion D in FIG. 1(A).

BEST MODE OF CARRYING OUT THE INVENTION

Figure 2B:
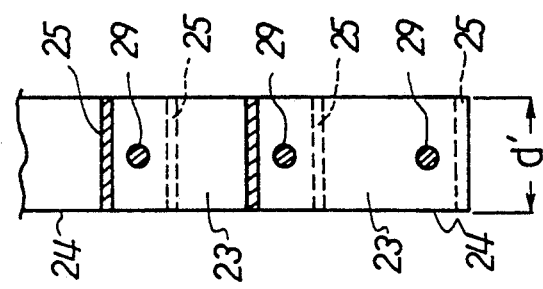
FIG. 2 shows an example of-prior art conveyor belts; (A') being a fragmentary plan view of the same and (B') being a sectional view taken along line B'—B' in view (A').

A preferred embodiment of carrying out the invention will now be described with reference to FIG. 1(A)-1(D).

Referring to the Figures, members 3 are U-shaped unit members, made of stainless steel plates having a thickness t of 1.2 mm and a width d of 12 mm. Each U-shaped unit member has opposed arms of a length of 30 mm and a bottom 5 of a length of 24.5 mm. Endless chains 11 are each formed by assembling a number of these unit members in a row in such a manner that the bottom 15 of it member is fitted in an open end portion 7 of another unit member. Then, ten rows of the endless chains are assembled as a set by inserting elongated and round stainless steel connecting rods 9 of 4 mm in diameter through the engaged portions of two adjoining unit members of each individual chain, such that each connecting rod 9 is common to the ten endless chains and all connecting rods are parallel and equally spaced. The space S between two adjacent connecting rods is set to 21.4 mm, that is, the connecting rods are arranged at a center-to-center distance of 25.4 mm. Each connecting rod carries nuts which are locked on both end portions thereof. As shown, each rod 9 is located below the top surface 12 and substantially in the center of the width of each unit member.

Members 13 are stainless steel intermediate rods which have a circular cross section of 4 mm in diameter and are disposed between two adjacent connecting rods 9 in parallel thereto and as high as these connecting rods. In this embodiment, one each of the intermediate rods is provided between two adjacent connecting rods. Particularly important points in the aforementioned arrangement are such that each intermediate rod has a length a little greater than the diameter of can bodies to be conveyed so as to provide each can body conveying section 15 with an adequate width W to hold the can bodies in a row between two adjacent endless chains and that each intermediate rod is disposed between two U-shaped unit members opposing to each other in two adjacent chains. In this embodiment, each intermediate rod is mounted midway between two adjacent connecting rods 9 extending parallel to each other. A conveyor belt 1 thus formed has an endless construction and comprises ten rows of the endless chains and nine rows of can body coveying sections 15.

The width W of each conveying section 15 is suitably determined so that the can bodies being conveyed may clear the endless chains at both sides. In this embodiment, W is set to 70 mm leaving clearance of 2 mm at each side of a 350 ml aluminum can body 66 mm in diameter.

Further, each intermediate rod in this embodiment has, via steps 17, a reduced diameter at both end portions which are rotatably supported within throughholes 19 formed at predetermined positions in the arms of unit members 3.

While the connecting rods are found below the top surface 12 of the unit members, the intermediate rods have the same diameter as the connecting rods and are arranged as high as the connecting rods so that a horizontal can body path line P. L. (see FIG. 1(C)) is formed by these connecting rods and intermediate rods. If there is a step between a path line formed by the intermediate rods and that formed by the connecting rods, smooth travel of the can bodies can not be expected and thus it is important that both the connecting rods and intermediate rods form the same pass line.

Since both the connecting rods and intermediate rods are disposed below the top surfaces 12 of the unit members 3, the path line P. L. essentially is a little lower than top surface 12 so that the endless chains serve as partitioning members and prevent the can bodies on a can body conveying section 15 from coming into contact with those on adjacent sections 15. Thus, the washing and surface treatment fluids such as the detergent solution, chemical solutions, industrial water and deionized water, which ar pumped up from the respective tanks and directed toward the can bodies, sufficiently wet the entire surfaces of the can bodies being conveyed through washing and surface treatment equipment and thus the can bodies receive sufficient surface treatment efficiently.

The unit members, the connecting rods and the intermediate rods which are used as the components to form a conveyor belt according to the invention, are not necessarily made of stainless steel, but can be made of other materials so long as they have adequate corrosion-, heat- and chemical-resistant properties. For instance, nickel chromium steel and resin-coated steel materials are available for the components.

The intermediate rods of the belt according to the invention do not have to be arranged parallel to one another so long as these rods form a common path line jointly with the connecting rods although it is more preferable to arrange them parallel from points of view of manufacture.

Further, while the intermediate rods in this embodiment are rotatably supported by inserting the end portions of a reduced diameter in the holes formed in the unit members, such intermediate rods may be fastened to the unit members by appropriate means such as welding.

From the viewpoints of ordinarily desired surface treatment operations, it is preferable to arrange the intermediate rods and connecting rods in an equally spaced relation. However, the intermediate rods do not have to be arranged in such a equally spaced relation, and for instance each intermediate rod can be positioned closer to either one of two adjacent connecting rods, although if the intermediate rods were positioned too close to either of the two adjacent connecting rods an uneven distribution of sprays directed from underneath the conveyor belt may occur.

Further, although the intermediate rods and connecting rods in this embodiment have the same diameter, the rods may be of different diameters, and for instance, connecting rods of 4 mm in diameter can be used in conjunction with intermediate rods of 3 mm in diameter so long as a single and horizontal path line is formed by the intermediate rods and the connecting rods.

However, it should be noted that if the intermediate or connecting rods were of too large a diameter, the desired distribution of sprays directed from under the conveyor belt would be disturbed. Therefore, a diameter of up to 4 or 5 mm is generally most suitable for these rods.

With the use of a conveyor belt according to the invention, inverted can bodies placed in a row (i.e., nine rows in this embodiment) on each conveying section are restricted from moving sideways by the endless chains serving as partitioning members and will not come in contact with those in the adjacent rows, so that the can bodies in all rows receive sufficient sprays of washing and surface treatment fluids on their outer surfaces and satisfactory surface treatment of the can bodies is achieved.

A conveyor belt according to the invention will not cause nicks or bends at edges of the open ends of the can bodies even if the can bodies are moved over the connecting rods or the intermediate rods as the open ends of the can bodies are in contact with the periphery of these rods. With the prior art conveyor belts of can body washing and surface treatment equipment, can bodies are placed in an inverted position on the belts and their open ends may come in contact with edges of the top horizontal portions of the sinuous plate members and therefore even a slight movement of the can bodies over the belts may readily cause nicks or bends at the edges of the open ends, giving rise to defects such as flange cracks that occasionally develop in the can bodies in a subsequent step of the can manufacture. Such nicks and bends can be obviated by a conveyor belt according to the invention.

A conveyor belt according to the invention offers following additional advantages.

Figure 2A:
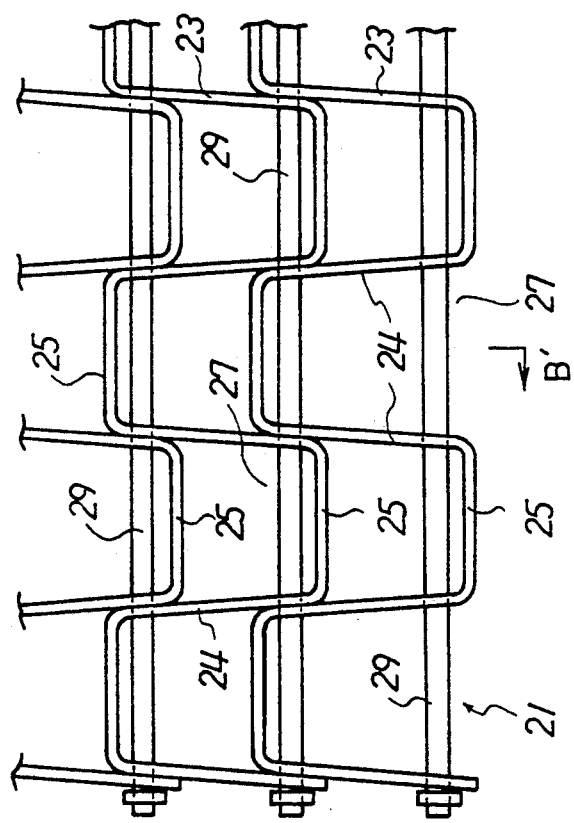

While sprays of a fluid directed toward a can body at a spray zone of the washing and surface treatment apparatus flow down along its wall, an amount of such fluid that remains attached to the edge and its vicinity of the open end of the can body is carried to the next spray zone. As a result, the fluid on the can body is carried by another fluid in this zone and both fluids fall together into a fluid tank underneath. Therefore, each fluid in the fluid tank, downstream in the apparatus, is contaminated or diluted by a mixing of two different fluids. In view of saving the fluids, it is desirable to suck and collect each fluid from the can bodies by providing suction nozzles beneath the conveyor belt at an area in the vicinity of the downstream end of each spray zone. In order to suck and collect such fluids from the can bodies without tipping them over, however, suction nozzles have to be disposed close to the open ends of the can bodies or the can body path line. With the prior art conveyor belts, however, a minimum allowable distance of the suction nozzles from the open ends of the can bodies is essentially governed by the width of the sinuous plate member (d' in FIG. 2(B')) which is usually 12 mm or more and the suction nozzles can not be brought close enough to the open ends of the can bodies to efficiently draw the fluid therefrom. Since an excessive suction force of the suction nozzles to compensate for this long distance will give rise to greater chances of a tipping over of the can bodies, this nozzle arrangement can not be adopted in conjunction with the prior art conveyor belts. On the other hand, a conveyor belt according to the invention allows the suction nozzles to be positioned closer to the open ends of the can bodies and at a distance thereto equivalent to the diameter of either the connecting rods or the intermediate rods, whichever is larger, forming the can body conveying sections (the diameter is 4 mm in the embodiment), so that the fluids can be sucked and collected from the open end of each can body efficiently with an adequate suction force which will nonetheless not cause the can bodies to tip over.

Further, with the prior art conveyor belts formed by assembling elongated sinuous plates having alternate U-shaped projections, the sinuous plates disturb flow of sprays of the fluids directed upwardly from underneath the belts, thus reducing an amount of the fluids reaching the inside of the can bodies. Since the can body conveying sections of a conveyor belt according to the invention are formed solely by relatively thin rods which are spaced from one another, a greater amount of the fluids can pass through the belt and thus a greater amount of the fluids can reach the inside of the can bodies to improve the efficiency of the processes.

We claim:

1. A conveyor belt for conveying can bodies in can body washing and surface treatment equipment, said conveyor belt comprising: a plurality of rows of endless chains and a plurality of endless can body conveying sections each defined between two adjacent rows of said endless chains, said endless chains each including a plurality of U-shaped unit members each of which members has a bottom engaged with an open end of another of said members, and connecting rods each having a circular cross section and linking said U-shaped members together at the engaged portions thereof, each said connecting rod being common to said rows of endless chains and rotatable in said engaged portions of the unit members linked together by the connecting rod, said can body conveying sections each defined between said two adjacent rows of endless chains including a plurality of said connecting rods and a plurality of intermediate rods and each having a width a little greater than the diameter of can bodies to be conveyed, said intermediate rods each having a circular cross section and being provided between said connecting rods, said intermediate rods each extending between adjacent rows of said endless chains and having a length a little greater than the diameter of the can bodies to be conveyed, and said connecting rods and said intermediate rods being disposed at a common elevation, to support open ends of the can bodies placed thereon in an inverted position, lower than a top horizontal portion of said endless chains.

2. A conveyor belt for conveying can bodies according to claim 1, wherein said connecting rods and intermediate rods extend parallel to one another.

3. A conveyor belt for conveying can bodies according to claim 1, wherein said connecting rods and intermediate rods are arranged in a uniformly spaced relation.

4. A conveyor belt for conveying can bodies according to claim 2, wherein said connecting rods and intermediate rods are arranged in a uniformly spaced relation.

5. A conveyor belt for conveying can bodies according to claim 1, wherein said connecting rods and intermediate rods have equal diameters.

6. A conveyor belt for conveying can bodies according to claim 2, wherein said connecting rods and intermediate rods have equal diameters.

7. A conveyor belt for conveying can bodies according to claim 3, wherein said connecting rods and intermediate rods have equal diameters.

8. A conveyor belt for conveying can bodies according to claim 4, wherein said connecting rods and intermediate rods have equal diameters.

9. A conveyor belt for conveying bodies can bodies according to claim 1, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

10. A conveyor belt for conveying can bodies according to claim 2, wherein the U-shaped unit members have holes in respective arms thereof extending rom the bottoms thereof, and said intermediate rods each have a reduced diameter at the end portions thereof, said reduced diameter end portions being rotatably supported in respective ones of said holes in the arms of said U-shaped unit members.

11. A conveyor belt for conveying can bodies according to claim 3, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

12. A conveyor belt for conveying can bodies according to claim 4, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

13. A conveyor belt for conveying can bodies according to claim 4, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

14. A conveyor belt for conveying can bodies according to claim 6, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

15. A conveyor belt for conveying can bodies according to claim 7, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

16. A conveyor belt for conveying can bodies according to claim 8, wherein the U-shaped unit members have holes in respective arms thereof extending from the bottoms thereof, and said intermediate rods each have a reduced diameter at the end portions thereof, said reduced diameter end portions being rotatably supported in respective ones of said holes in the arms of said U-shaped unit members.

* * * * *